(12) United States Patent
Bargeman et al.

(10) Patent No.: US 7,858,058 B2
(45) Date of Patent: Dec. 28, 2010

(54) METHOD FOR CRYSTALLIZING SOLUBLE SALTS OF DIVALENT ANIONS FROM BRINE

(75) Inventors: Gerrald Bargeman, Wageningen (NL); René Lodewijk Maria Demmer, Enter (NL); Boris Kuzmanovic, Arnhem (NL); Cornelis Elizabeth Johannus Van Lare, Wijchen (NL); Mateo Jozef Jacques Mayer, Amersfoort (NL); Maarten André Irène Schutyser, Wageningen (NL); Jan Barend Westerink, Lochem (NL)

(73) Assignee: Akzo Nobel N.V., Arnhem (NL)

( * ) Notice: Subject to any disclaimer, the term of this patent is extended or adjusted under 35 U.S.C. 154(b) by 700 days.

(21) Appl. No.: 11/666,000

(22) PCT Filed: Oct. 18, 2005

(86) PCT No.: PCT/EP2005/055340

§ 371 (c)(1),
(2), (4) Date: Sep. 21, 2007

(87) PCT Pub. No.: WO2006/045718

PCT Pub. Date: May 4, 2006

(65) Prior Publication Data

US 2008/0056981 A1 Mar. 6, 2008

Related U.S. Application Data

(60) Provisional application No. 60/637,483, filed on Dec. 20, 2004.

(30) Foreign Application Priority Data

Oct. 22, 2004 (EP) .................................. 04077909

(51) Int. Cl.
*B01D 61/00* (2006.01)
(52) U.S. Cl. ........................ 423/184; 423/186; 423/193; 423/202; 423/420; 423/421; 423/499.4; 423/499.5; 423/545; 210/639; 210/698; 210/701; 23/302 R; 23/303; 23/302 A; 23/302 T
(58) Field of Classification Search .................. 423/184, 423/186, 193, 202, 420, 421, 545, 499.4, 423/499.5; 210/639, 698, 701; 23/302 R, 23/303, 302 A, 302 T
See application file for complete search history.

(56) References Cited

U.S. PATENT DOCUMENTS

| 5,587,083 | A | 12/1996 | Twardowski |
| 6,004,464 | A | 12/1999 | Lien |
| 6,036,867 | A | 3/2000 | Jogand et al. |
| 6,187,195 | B1 | 2/2001 | Zarges et al. |

FOREIGN PATENT DOCUMENTS

| EP | 0 821 615 | 2/1998 |
| EP | 1 202 931 | 5/2002 |
| GB | 2 395 946 | 6/2004 |
| WO | WO 96/33005 | 10/1996 |
| WO | WO 01/04052 | 1/2001 |
| WO | WO 03/006377 | 1/2003 |
| WO | WO 2004/018068 | 3/2004 |

OTHER PUBLICATIONS

Samhaber, W. M. et al., "Field test results of a Nanofiltration application for separating almost saturated brine solutions of the vacuum salt production," ECCE—Nürnberg Jun. 26-28, 2001, www.ivt.unilinz.ac.at/Forschung/Publikationen/pdf/ecce1.pdf.

Driloi, E. et al., "Integrated system for recovery of $CaCo_3$, NaCl and $MgSO_4 7H_2O$ from nanofiltration retentate," L. of Membrane Science, 239, pp. 27-38, (2004).

Patel, S. et al., "New antifoulants for deposit control in MSF and MED plants," Desalination, 124, pp. 63-74, (1999).

Hassan, A.M. et al., "A new approach to membrane and thermal seawater desalination process using nanofiltration membranes (Part 1)," Desalination, 118, p. 35-51, (1998).

Karelin, F.N. et al., "Salt concentration and recovery from aqueous solutions using pressure-driven membrane processes," Desalination, 104, pp. 69-74, (1996).

Ohya, H. et al., "Integrated system for complete usage of components in seawater, A proposal of inorganic chemical combinat on seawater," Desalination, 134, pp. 29-36, (2001).

Gill, Jasbir S., "A novel inhibitor for scale control in water desalination," Desalination, 124, pp. 43-50, (1999).

(Continued)

*Primary Examiner*—Steven Bos
(74) *Attorney, Agent, or Firm*—Kenyon & Kenyon LLP

(57) ABSTRACT

The invention pertains to removing soluble alkali metal or ammonium salt of a divalent anion from brine comprising following steps: obtaining brine with NaCl-concentration between 150g/L and saturation in the presence or absense of a cyrstal growth inhibitor for NaCl(GCI-NaCl),or with NaCl concentration above saturation in the presence of a CGI-NaCl, said brine optionally comprising a crystal growth inhibitor for the alkali metal or ammonium salt of the divalent anion(CGI-DA); if necessary, acidify the solution to pH<11.5; if the concentration of CGI-DA is less than 20 mg/L, adding CGI-DA to obtain at least 20 mg CGI-DA/L; subjecting the solution to a membrane filtration; if the concentration of CGI-DA in the concentration from the separation is less than 20 mg/L, adding CGI-DA to obtain at least 20 mg CGI-DA/L; crystalling the concentration; removing the crystallized alkali metal or ammonium salt of the divalent anion.

17 Claims, 1 Drawing Sheet

OTHER PUBLICATIONS

Figure 1:
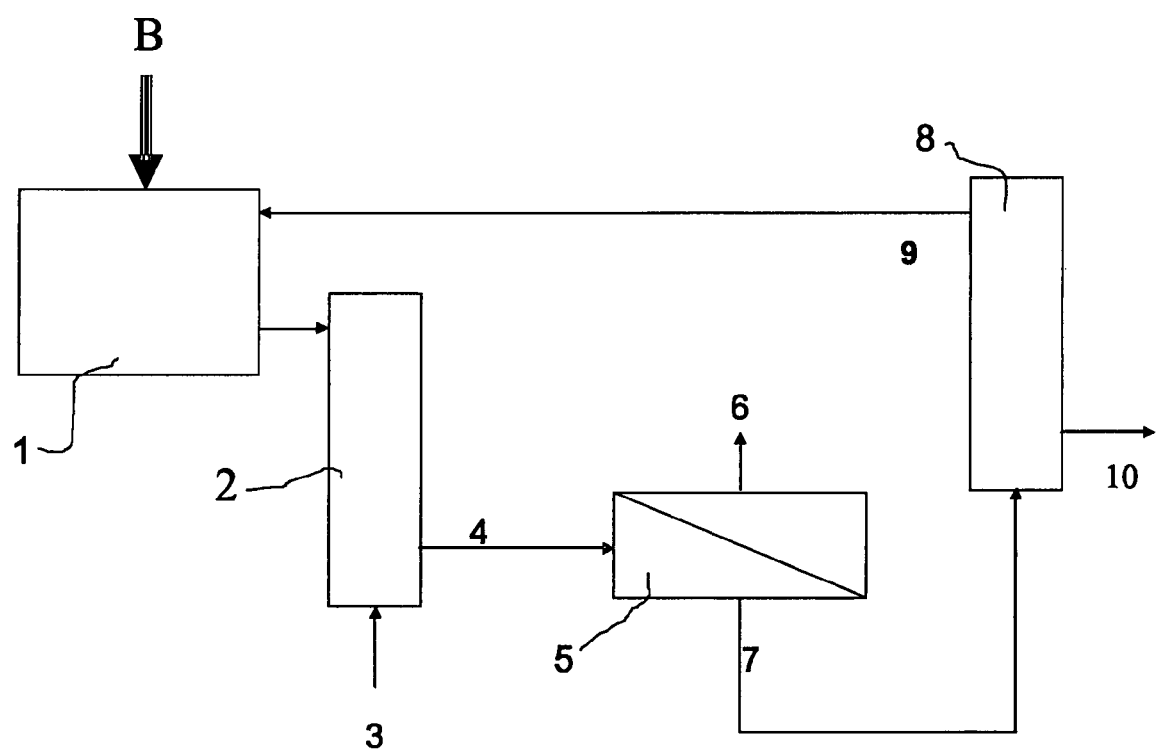

Samhaber, W.M. et al., "The application of Nanofiltration in the Salt Industry," www.ivt.jku.at/homeE/pages/research/publications/pdf/Application.pdf, 14th International Congress of Chemical and Process Engineering (CHISA) Aug. 2000.

International Preliminary Report on Patentability dated Apr. 24, 2007, PCT International Patent Application No. PCT/EP2005/055340.

International Preliminary Report on Patentability and Written Opinion of the International Search Authority, PCT International Patent Application No. PCT/EP2005/055340, dated Apr. 24, 2007.

International Search Report, PCT International Application No. PCT/EP2005/055340, dated Mar. 1, 2006.

Written Opinion of the International Search Authority, PCT International Patent Application No. PCT/EP2005/055340.

International Search Report, PCT International Application No. PCT/EP2005/055340.

Flow chart

METHOD FOR CRYSTALLIZING SOLUBLE SALTS OF DIVALENT ANIONS FROM BRINE

REFERENCE TO RELATED APPLICATION(s)

This application claims the benefit of U.S. Provisional Application No. 60/637,483 filed on Dec. 20, 2004.

The invention relates to a method for at least partially removing soluble alkali metal or ammonium salts of divalent anions from a concentrated, aqueous, alkali metal or ammonium ion and divalent anion-containing brine solution by crystallizing these salts from said brine.

Brine is typically produced by dissolving a natural source of NaCl in water. Hence, brine normally also contains divalent anion impurities, typically $SO_4^{2-}$, $CO_3^{2-}$, and monovalent cation impurities such as K, Li, and/or $NH_4^+$. In the preparation process of solid sodium chloride, generally via evaporative crystallization of brine, and in the preparation processes of products wherein brine is used as a raw material, such as chlorine production, most of these anions and cations are to be removed. In evaporative sodium chloride crystallization processes, for example, the salt obtained has imperfections in the crystal lattice and contains occlusions, i.e. small pockets of mother liquor of the evaporative crystallization process (present in cavities in the salt crystals). Due to these imperfections and occlusions, the sodium chloride, as well as the brine produced therefrom, is contaminated with compounds present in the mother liquor. In particular, the amounts of $SO_4^{2-}$ and/or $CO_3^{2-}$ that thus end up in the sodium chloride form a problem in many applications of the produced sodium chloride. Hitherto, additional washing steps and drying steps, such as energy-consuming centrifuge steps, have been employed to reduce the levels of contaminants. Especially if a brine produced from salt or wet salt is to be used in modern membrane electrolysis cells, said contaminants need to be removed. For these reasons, processes have been developed for (partially) removing divalent anion impurities, especially sulfate, from brines. EP 0 821 615, for instance, discloses a nanofiltration process for filtering a brine comprising e.g. sodium sulfate or sodium dichromate by feeding said brine comprising more than 50 g/l of sodium chloride to a nanofiltration membrane module under a positive applied pressure to provide a concentrate and a permeate liquor for selectively decreasing the concentration of sodium chloride relative to the concentration of sodium sulfate or sodium dichromate in said brine. However, the sulfate or dichromate salts can, at best, be removed only up to their solubility limits. Thus, a brine comprising high concentrations of these salts will have to be purged, which is undesired both from an environmental point of view and from an economic point of view, since it leads to significant salt losses.

U.S. Pat. No. 6,036,867 discloses a method for the desalination and demineralization of aqueous solutions containing acids and/or metal salts wherein contaminating salts are removed by crystallization from a solution supersaturated in said salts. This method comprises the steps of:

introducing an inhibitor for inhibiting the precipitation of predetermined salts in a solution to be treated,
   concentrating the salts into a supersaturated concentrate e.g. by subjecting the solution to nanofiltration,
   removing the precipitation inhibitor, and subsequently precipitating crystallizable supersaturated salts, such as calcium sulfate, in the concentrate.

Said removal of the inhibiting effect of the precipitation inhibitor is disclosed to be necessary in order to be able to effectuate the precipitation/crystallization of the supersaturated salts.

U.S. Pat. No. 6,036,867 is not concerned with sodium chloride solutions having a sodium chloride concentration of at least 150 g/L, nor does this reference disclose crystallizing brine-soluble alkali metal or ammonium salts of divalent anions. Further, it was found that when such a method is used for the crystallization of salts which are readily soluble in brine, such as ammonium or alkali metal salts of divalent anions, a slurry is formed which, due to primary nucleation, comprises very small crystals and crystal aggregates which can hardly be separated from the mother liquor using conventional separation techniques. Consequently, washing of the salt slurry and separation of said salt slurry from the mother liquor in such a way that the moisture content of the slurry is below 10 percent by weight, which is typically needed, becomes a very costly step.

In view of the above, there is a need for an improved process for removing readily soluble alkali metal or ammonium salts of divalent anions from a concentrated brine solution such that a single process not only produces a brine which is at least partially freed of divalent anion-comprising contaminants and thus made suitable for further processing, but that at the same time divalent anion-comprising salts can be isolated such that they are available for further use.

It has now surprisingly been found that the readily soluble salts of divalent anions such as their ammonium or alkali metal salts can be isolated from a concentrated alkali metal or ammonium ion and divalent anion-comprising brine solution after further concentrating the brine solution in the presence of a crystal growth inhibitor for the alkali metal or ammonium salt of said divalent anion using membrane filtration and subsequent crystallization of the salt from the obtained concentrate in the presence of at least 20 ppm of said crystal growth inhibitor. Unexpectedly, it turned out to be possible to reduce the super-saturation for said salt, i.e. to crystallize said salt, in the presence of the crystal growth inhibitor, even in the relatively high amount of at least 20 ppm employed. It was observed that the presence of crystal growth inhibitor(s) during the crystallization step has the effect that primary nucleation of salt crystals is prevented, which finally results in the formation of relatively coarse salt crystals (i.e. crystals with a diameter of about 300 microns) having a narrow size distribution with a large average particle diameter, preferably more than 500 µm, and most preferably more than 1 mm, and having reduced impurity levels. These crystals turned out to be easily separable from the aqueous slurry, e.g. by filtration. The narrow crystal size distribution makes it possible to apply conventional centrifuges as well.

In more detail, the present invention thus relates to an improved method for at least partially removing a soluble alkali metal or ammonium salt of a divalent anion from an aqueous, alkali metal or ammonium ion and divalent anion-containing brine solution comprising a crystal growth inhibitor for the alkali metal or ammonium salt of said divalent anion, comprising the steps of:

obtaining a brine solution having a sodium chloride concentration of between 150 g/L and saturation in the presence or absence of a crystal growth inhibitor for sodium chloride, or having a sodium chloride concentration above saturation in the presence of a crystal growth inhibitor for sodium chloride, said brine solution optionally comprising a crystal growth inhibitor for the alkali metal or ammonium salt of the divalent anion;
   if necessary, acidifying said solution to a pH below 11.5, while maintaining a sodium chloride concentration of at least 150 g/L;
   if the concentration of the crystal growth inhibitor for the alkali metal or ammonium salt of the divalent anion in the brine solution is less than 20 mg/L, adding an amount of said crystal growth inhibitor such that the resulting brine solution comprises at least 20 mg/L of the crystal growth inhibitor for the alkali metal or ammonium salt of the divalent anion;

subjecting the resulting solution to a membrane filtration step, thereby separating the brine solution into a brine stream being supersaturated for the divalent anion-comprising salt (concentrate) and a brine stream being undersaturated for the divalent anion-comprising salt (permeate);

if the concentration of the crystal growth inhibitor for the alkali metal or ammonium salt of the divalent anion in the concentrate is less than 20 mg/L, adding an amount of said crystal growth inhibitor such that said concentrate comprises at least 20 mg/L of the crystal growth inhibitor for the alkali metal or ammonium salt of the divalent anion;

subjecting the resulting concentrate to a crystallization process, removing the crystallized alkali metal or ammonium salt of the divalent anion; and optionally, recycling at least part of the mother liquor of the crystallizer to the brine solution in order to subject it to the membrane filtration step again.

A particular advantage of the process according to the present invention is that because the alkali metal or ammonium salt of the divalent anion is isolated from the concentrate by crystallization, compared to conventional processes no or merely a small liquid purge is needed. Hence, significantly less waste is produced. Furthermore, with the process according to the present invention two valuable products, viz. purified brine and divalent anion-comprising salts can be obtained in a single process.

By the phrase "obtaining a brine solution having a sodium chloride concentration of between 150 g/L and saturation in the presence or absence of a crystal growth inhibitor for sodium chloride, or having a sodium chloride concentration above saturation in the presence of a crystal growth inhibitor for sodium chloride" is meant that a brine solution having a sodium chloride concentration of at least 150 g/L is obtained, and if said brine solution has a sodium chloride concentration of between 150 g/L and saturation, a crystal growth inhibitor for sodium chloride may optionally be present, but if said brine solution has a sodium chloride concentration above the theoretical saturation level, it is required that an effective amount of a crystal growth inhibitor for sodium chloride be present to prevent the sodium chloride from precipitating during the membrane filtration step and, as a consequence, from clogging the membrane. By the term "effective amount" is meant that the crystal growth inhibitor is added in such an amount that it is able to prevent primary nucleation of the sodium chloride and, thus, precipitation of the sodium chloride during membrane filtration.

The use of brine solutions comprising such high sodium chloride contents is desirable and convenient because it makes otherwise needed laborious procedures of dilution of the brine before the filtration step and concentration steps after the filtration step superfluous. Moreover, it was found that these high sodium chloride concentrations are in fact necessary in order to be able to effectuate supersaturation in the concentrate of the soluble divalent anion-comprising salt according to the invention. Preferably, the sodium chloride concentration is at least 200 g/L, more preferably at least 275 g/l, and most preferably it is a saturated sodium chloride solution.

The brine solution may be diluted with water if necessary to obtain a sodium chloride concentration between 150 g/L and saturation.

Said brine solution is acidified if necessary, i.e. if the brine solution has a pH value of above 11.5 or if the brine solution already has a pH value below 11.5 but the membrane filtration step is to be performed at an even lower pH value. Preferably, the brine solution obtained in the first step according to the present invention has a pH value of above 11.5, which is subsequently acidified to a pH below 11.5. Acidification is preferably performed using $H_2SO_4$ or HCl, and more preferably using $CO_2$, optionally together with other acids. The use of $CO_2$ is particularly preferred, because $OH^-$ is then converted into $CO_3^{2-}$, which will be retained much more efficiently during membrane filtration than $OH^-$. Furthermore, in many cases the conversion of $OH^-$ into $CO_3^{2-}$ has a positive influence on the lifetime and/or stability of the membrane. The brine is preferably acidified so as to obtain a brine solution having a pH of between 2 and 11.5, more preferably between 7 and 11.5, and most preferably between 9 and 10.5.

The aqueous alkali metal or ammonium ion and divalent anion-containing brine solution which is subjected to the membrane filtration step in the process of this invention preferably contains very low amounts of $Ca^{2+}$ and $Mg^{2+}$. The $Ca^{2+}$ and $Mg^{2+}$ contents preferably are less than 1 mmole/L and less than 0.1 mmole/L, respectively.

All crystal growth inhibitors for sodium chloride known in the art can be used in the process according to the present invention. It is noted that the crystal growth inhibitor may also be a mixture of two or more crystal growth inhibitors for sodium chloride. A suitable crystal growth inhibitor for sodium chloride is preferably selected from the group consisting of humic acids, polymaleic acid, polyacrylic acid, sugars, oligopeptides, polypeptides, and polymers bearing two or more carboxylic acid groups or carboxyalkyl groups and optionally further phosphate, phosphonate, phosphino, sulfate, and/or sulfonate groups, such as carboxymethyl cellulose with phosphate groups. Most, preferably the crystal growth inhibitor for sodium chloride is selected from the group consisting of humic acids, polymaleic acid, and polyacrylic acid.

The divalent anion according to the present invention contained in the brine, preferably sulfate or carbonate, has an alkali metal or ammonium counterion. Said counterion is preferably selected from the group consisting of sodium, potassium, lithium, and ammonium. Most preferably, it is sodium. The salt to be crystallized according to the present invention preferably is sodium sulfate or sodium carbonate. Most preferred is sodium sulfate.

The crystal growth inhibitor for the alkali metal or ammonium salt of the divalent anion according to the present invention can be any additive which is able to prevent primary nucleation of the salt to be crystallized and which allows operation of the membrane filtration unit without the formation of solids. It is noted that this crystal growth inhibitor may also consist of a mixture of two or more crystal growth inhibitors. Preferred crystal growth inhibitors for the alkali metal or ammonium salt of the divalent anion are one or more compounds selected from the group consisting of polymaleate, polyphosphine carboxylic acid (such as Belsperse®), polyphosphate, polycarboxylic acid, polyacrylic acid, and humic acid. Other crystal growth inhibitors may also be used. Said crystal growth inhibitor is used in a total amount of at least 20 mg/L, preferably at least 25 mg/L, more preferably at least 50 mg/L, and most preferably at least 75 mg/L. Preferably, amounts up to 250 mg/L, and more preferably up to 150 mg/L are used for the crystal growth inhibitor.

Further, in order to effectuate crystallization of the alkali metal or ammonium salt of the divalent anion according to the present invention (such as sodium sulfate), preferably seeds of that divalent anion-comprising salt and/or high shear are used to induce secondary nucleation, thereby offering additional surface for crystal growth. Usually, a fluidized bed crystallizer is used to obtain a monodisperse product. Other crystallization methods can also be used, but the product quality may be reduced.

It is furthermore noted that the "membrane" which is placed inside a membrane filtration unit for separating the divalent anion from the aqueous brine solution, as referred to throughout this specification, is meant to denote any conventional membrane, preferably a nanofiltration membrane, which is designed to selectively reject divalent and other polyvalent anions and has a molecular weight cut-off of at least 100 Da, preferably at least 150 Da, and wherein the molecular weight cut-off is at most 25,000 Da, preferably at most 10,000 Da, more preferably at most 2,500 Da, and most preferably at most 1,000 Da. The nanofiltration system preferably utilizes semipermeable membranes of the nanofiltration type, such as those sold as FilmTec® NF270 (The Dow Chemical Company), DESAL® 5DK, DESAL® 5DL, and DESAL® 5HL (all GE/Osmonics), NTR® 7250 (Nitto Denko Industrial Membranes), and AFC®-30 (PCI Membrane Systems LTD). These and similar membranes suitable for use in the method according to the present invention are effective for rejecting a high percentage of all divalent anions and especially sulfate and carbonate, as indicated by an observed sulfate retention in excess of 80% and preferably in excess of 90% during processing of a 1 g/L $MgSO_4$ solution in demineralized water in full recycle operation, while permitting passage through the membrane of a high percentage of all monovalent anions and especially chloride and bromide, as indicated by a chloride retention below 80% and preferably below 70% during processing of a 1 g/L NaCl solution in demineralized water in full recycle operation. Although a nanofiltration-type semipermeable membrane such as the membrane types mentioned earlier is preferred, other nanofiltration membranes having these high divalent ion rejection characteristics are commercially available and may alternatively be employed.

By employment of a spiral-wound nanofiltration module which has feed-channel-providing spacer material having a thickness of at least about 1 mm, the treated brine can be efficiently pumped to a pressure between about 1.5 MPa and about 10 MPa and then applied to the module, at which pressure it will preferably have an axial velocity of at least about 10-15 cm per second.

The terms "supersaturated for the divalent anion-comprising salt" and "undersaturated for the divalent anion-comprising salt" ("divalent anion-comprising salt" is also indicated in this specification as the alkali metal or ammonium salt of a divalent anion) relate to solutions not comprising a crystal growth inhibitor for said divalent anion-comprising salt, wherein the concentration of the alkali metal or ammonium salt of said divalent anion is higher and lower, respectively, than the theoretical maximum concentration at thermodynamic equilibrium of the alkali metal or ammonium salt of said divalent anion at which said salt remains in solution, measured at the same temperature and pressure at which the method for at least partially removing the alkali metal or ammonium salt of the divalent anion from the brine solution is to be performed.

Illustrated diagrammatically in FIG. 1 is a representative flow chart for removing sulfate (or another divalent anion) from brine. Brine (B) is continuously fed to a brine buffer tank 1. Alternatively, a batch of brine (e.g. 10,000 litres) is processed. If necessary, the brine flow is acidified to a pH of preferably between about 7 and about 11.5, and more preferably to a pH of about 10.5, in a scrubber 2. If $CO_2$ is used for the acidification, it can e.g. be introduced together with flue gas through conduit 3. An appropriate crystal growth inhibitor for the alkali metal or ammonium salt of the divalent anion which is at least partially to be removed from said brine is also present.

The treated brine is permitted to flow, for instance by gravity, through an outlet line 4, which may include valves, pumps, and the like. The outlet line 4 connects to an inlet of a nanofiltration unit 5. This unit includes several spiral-wound nanofiltration modules placed in several parallel pressure vessels. These pressure vessels may be operated in one or more stages, optionally with recirculation of part of the concentrate from each stage to the inlet of that stage. The other part of the concentrate is sent to the next stage.

Although less preferred, water may be added to the feed flow of the membrane filtration unit to prevent the crystallization of sodium chloride inside said membrane filtration unit.

The stream which is undersaturated for the divalent anion-comprising salt (permeate) is led through outlet conduit 6, whereas the stream which is supersaturated for the divalent anion-comprising salt (concentrate, sometimes also called retentate) is led through outlet conduit 7 to a crystallizer 8. Each of these conduits may contain valves, pumps, and the like.

The crystallizer 8 may be of the fluidized bed crystallizer type, the stirred vessel type, or any other conventionally used crystallization equipment. The crystallizer has an outlet 9 for feeding mother liquor to conduit 3 or to inlet 4 of the filtration unit 5, and an outlet 10 for collecting the crystallized sulfate.

In a preferred embodiment, unpurified surface water is used in a solution mining process to produce brine, which is further treated in a brine purification process. In an evaporation plant sodium chloride is produced and the mother liquor is subjected to the process according to the present invention as depicted in FIG. 1. Since the surface water is not purified, organic compounds containing polycarboxylic groups, e.g., humic acids, which may be present finally end up in the mother liquor, where they act as a crystal growth inhibitor for the alkali metal or ammonium salt of the divalent anion. Hence, it is not always required to add additional crystal growth inhibitor to the mother liquor. It is noted that the organics in the so-called unpurified surface water can be introduced deliberately by adding nutrients to the surface water, resulting in biological activity. Once cell material produced in this way is fed to the brine well, the cells will be destroyed, introducing the natural crystal growth inhibitor into the brine.

The process according to the present invention can also be applied for the purification of recycle brine in an electrolysis plant. To avoid unacceptable accumulation of sulfate in the recycle brine, in conventional processes a specific volume of the recycle brine needs to be purged. However, because of the membrane filtration step according to the present invention combined with sodium sulfate crystallization and the use of the crystal growth inhibitor for sodium sulfate, the volume of this purge can be kept to a minimum.

The isolated alkali metal or ammonium salts of the divalent anion according to the invention can be employed in a variety of different applications known to the skilled person. Sodium sulfate can for example be employed in laundry detergents, wood pulp manufacturing, and the glass industry. Sodium carbonate can be used in the manufacture of glass, the manufacture of chemicals such as sodium silicates and sodium phosphates, the pulp and paper industries, the manufacture of detergents, and for the treatment of water. Potassium sulfate can e.g. be used for the preparation of the acid sulfate or bisulfate, $KHSO_4$. Potassium carbonate can be employed in the common application for producing other potassium compounds.

The permeate, comprising merely small amounts of divalent anions such as sulfate and carbonate, can be used as raw material in sodium chloride production or soda production.

The invention is illustrated by the following examples. Although the invention has been described with regard to certain preferred embodiments which constitute the best mode presently known to the inventor, it should be understood that various modifications and changes such as would be obvious to one having ordinary skill in this art may be made without departing from the scope of the invention, which is set forth in the appended claims. For example, although spiral-wound membrane modules are preferred, other nanofiltration-type semipermeable membrane separation devices suitable for treating brine may alternatively be employed.

EXAMPLE 1

An experiment was performed using two membrane types, flat sheet FilmTec® NF270 polyamide thin film NF membranes (ex The Dow Chemical Company) and flat sheet Desal® 5DK polyamide NF membranes (ex GE/Osmonics). The membrane types were tested simultaneously in a DSS lab stack unit, which was operated in continuous feed and bleed operation mode at a cross-flow rate of 600 L/h. In total 0.144 $m^2$ membrane surface area was installed. A mother liquor sample obtained from a sodium chloride crystallizer at the brine production plant in Delfzijl, The Netherlands, was supplied to the unit. The pH of the mother liquor was reduced to pH 10.4 using a concentrated $H_2SO_4$ solution. 90 ppm of humic acids was present in the mother liquor. The resulting mother liquor sent to the DSS unit contained, amongst others, 1,140 meq/L $SO_4^{2-}$. During membrane filtration at 35 bar pressure and 23° C. a concentrate containing approximately 1,770 meq/L $SO_4^{2-}$ was produced. The majority of the concentrate was recycled to the membrane feed line (cross-flow operation), while part of the concentrate was purged to obtain a concentration factor (the ratio of the fresh feed flow over the purged concentrate flow) of approximately 1.6. The membranes showed sulfate retentions in excess of 90%. Despite the supersaturation of sodium sulfate in the concentrate, no crystallization was observed during nanofiltration.

EXAMPLE 2

Another experiment was performed using two membrane types, flat sheet FilmTec® NF270 polyamide thin film NF membranes (ex The Dow Chemical Company) and flat sheet Desal® 5DK polyamide NF membranes (ex GE/Osmonics). The membrane types were tested simultaneously in a DSS lab stack unit, which was operated in continuous feed and bleed operation mode at a cross-flow rate of 600 L/h. In total 0.144 $m^2$ membrane surface area was installed. Mother liquor comprising 90 ppm of humic acid, obtained from a sodium chloride crystallizer at the brine production plant in Delfzijl, The Netherlands, was supplied to the unit. The pH of the mother liquor was reduced to pH 10.4 using a concentrated $H_2SO_4$ solution. Furthermore, 10 ppm of Belsperse® 164 was added to the mother liquor, using pure Belsperse® 164. The resulting mother liquor sent to the DSS unit contained, amongst others, 1,145 meq/L $SO_4^{2-}$, 140 g/L $Na^+$, 11 g/L $K^+$, 168 g/L $Cl^-$, and 650 mg/L $Br^-$. During membrane filtration at 50 bar pressure and 29° C. a concentrate containing approximately 1,580 meq/L $SO_4^{2-}$ was produced. The majority of the concentrate was recycled to the membrane feed line (cross-flow operation), while part of the concentrate was purged to obtain a concentration factor of approximately 1.4. The membranes showed sulfate retentions in excess of 95%, and chloride and bromide retentions of approximately −16% and −34%, respectively. Despite the supersaturation of sodium sulfate in the concentrate, no crystallization was observed during nanofiltration.

EXAMPLE 3

A brine containing 10 ppm of Belsperse® 164 and 90 ppm of humic acids as crystal growth inhibitors was supersaturated for sodium sulfate by subjecting it as a feed brine comprising 1,145 meq/l of $SO_4^{2-}$ to a nanofiltration unit. The feed brine was concentrated, resulting in a concentrate comprising 1,680 meq/L of $SO_4^{2-}$. The nanofiltration unit was operated in a continuous (feed and bleed) cross-flow operation, i.e. by adding an amount of fresh feed equal to the permeate and the concentrate being removed from the nanofiltration unit. The experiment was performed using flat sheet FilmTec® NF270 polyamide thin film NF membranes (ex The Dow Chemical Company) and flat sheet Desal® 5DK polyamide NF membranes (ex GE/Osmonics). The membrane sheets were tested simultaneously in a DSS lab stack unit (which was operated in a crossflow rate of 600 litres per hour). In total 0.144 $m^2$ of membrane surface area was installed. Membrane filtration was performed at 50 bar operating pressure and a temperature of 29° C. The concentration factor was 1.5 (ratio of the mass flow of fresh feed over mass flow of concentrate leaving the nanofiltration unit). During the concentration process, no crystallization of sulfate was observed.

Subsequently, it was investigated whether the supersaturation could be decreased by the simple addition of solid sodium sulfate ($Na_2SO_{4.0}aq$) crystals, which act as seeds, offering surface for crystal growth. Amounts of 0, 10, 40, and 60 g of sodium sulfate crystals, respectively, were added to 100 mL supersaturated brine in a beaker. The slurry was mixed for 10 minutes and the temperature was maintained at 40° C. No crystallization was observed in the absence of sodium sulfate crystals. Directly after mixing, samples were taken and filtrated to remove crystals. The samples were analyzed for sulfate. Sulfate concentrations for the different amounts of added sodium sulfate crystals were 1,680, 1,400, 1,370, and 1,350 meq/L, respectively. Therefore, it can be concluded that the addition of seeds helps to reduce supersaturation in the sodium sulfate. In addition, it was observed that without the addition of sodium sulfate seeds, no primary nucleation occurred. It should be noted that the conditions in these experiments have not yet been optimized. It is therefore to be expected that, for example, an increase in mixing time may result in a further decrease of the sulfate concentration.

EXAMPLE 4

A brine with 275 g/L of sodium chloride was prepared. Subsequently, the brine was saturated with sodium sulfate at 35° C. by adding excess sodium sulfate (i.e. about 100 g/l of $Na_2SO_4$). The resulting solution was filtered using filter paper and a Buchner-type filter to remove solid sodium sulfate. From this solution a sample was taken to determine the initial sulfate level by ion chromatography. Four stirred glass beakers covered with a lid were filled with 0.5 kg of the justobtained clear solution. A dilute Belsperse® 164 solution was added to arrive at the final Belsperse® 164 concentrations of 0, 2.1, 22, and 82 ppm, respectively. The temperature of the glass beakers was controlled via a heat jacket filled with water. The initial temperature was set at 35° C. and the sulfate level was determined via ion chromatography. This is the blank experiment (entry 1 in Table I). Subsequently, the temperature was gradually increased in all four beakers to 95° C. The solubility of sodium sulfate decreases with increasing temperature. It was visually observed that at 80° C. the sodium sulfate crystallized in the absence of Belsperse® 164. At 95° C. it was observed that the sodium sulfate also crystallized in the presence of 2.1 ppm Belsperse® 164, whereas in the other beakers with 22 and 82 ppm Belsperse® 164 no crystallization occurred. At the end of the experiment samples were taken and filtered over a small 0.45 μm filter. The sulfate level was determined via ion chromatography. The results are summarized in Table I:

| Entry | Amount of Belsperse (ppm) | $[SO_4^{2-}]$ in mother liquor (g/L) |
|---|---|---|
| 1. | 0 | 58 (at 35° C.) |
| 2. | 0 | 50* |
| 3. | 2.1 | 55* |
| 4. | 22 | 58* |
| 5. | 82 | 58* |

*After being heated up to 95° C.

This experiment showed that the presence of Belsperse® 164 effectively inhibits the crystallization of sodium sulfate. For the blank experiment primary nucleation of sodium sulfate resulted in the formation of very fine particles. Although less pronounced, this phenomenon was also observed for the experiment with 2.1 ppm of Belsperse® 164.

COMPARATIVE EXAMPLE 5

Another experiment was performed using newly installed flat sheet NF® 270 polyamide thin film NF membranes (ex The Dow Chemical Company). The membrane sheets were tested simultaneously in a DSS lab stack unit, which was operated at a cross-flow rate of 600 L/h. In total 0.18 m² of membrane surface area was installed. A feed solution was prepared by dissolving $Na_2SO_4$ in demineralized water in an amount of 61.7 g per kg of total feed and, subsequently, sodium chloride (NaCl (71381) ex Fluka Chemie GmbH, CH-9471 Buchs (Switzerland)) was added in an amount of 246 g of per kg of the total feed. No crystal growth inhibitor was added. The slurry feed was filtered over a Whatman 54 (20-25 μm) filter to remove undissolved solids. The resulting clear filtrate was concentrated batch-wise in the nanofiltration unit to a concentration factor CF=1.08, meaning that permeate was discharged, while the concentrate was returned to the feed vessel, until the concentration factor, i.e. the ratio of the initial feed weight over the concentrate weight, was 1.08. Subsequent operation under this condition with a recycle of both concentrate and permeate to the feed vessel was maintained for two hours. The membrane filtration was performed at 35 bar operating pressure and a temperature of 35° C. The concentrate under this condition contained 1,162 meq/L of $SO_4^{2-}$. Subsequently, the concentrate was further concentrated to a concentration factor of CF=1.16 (related to the original feed), by discharging permeate from the unit and recycling concentrate to the feed vessel. During the batch-wise concentration to CF=1.16 crystallization was observed in the feed vessel and very small $Na_2SO_4$ crystals were produced. The mother liquor of the concentrate at CF=1.16 contained 1,221 meq/L of $SO_4^{2-}$. After two hours of operation at CF=1.16 the concentration of the mother liquor had decreased to 1,174 meq/L $SO_4^{2-}$, since even more crystals had been formed.

COMPARATIVE EXAMPLE 6

Another experiment was performed using newly installed flat sheet NF® 270 polyamide thin film NF membranes (ex The Dow Chemical Company). The membrane sheets were tested simultaneously in a DSS lab stack unit, which was operated at a cross-flow rate of 600 L/h. In total 0.18 m² membrane surface area was installed. A feed solution was prepared by dissolving $Na_2SO_4$ in demineralized water in an amount of 62.6 g per kg of total feed and sodium chloride (NaCl (71381) ex Fluka Chemie GmbH, CH-9471 Buchs (Switzerland)) was added in an amount of 235 g per kg of total feed. 2.4 mg Belsperse® 164 crystal growth inhibitor per kg total feed was added (as 6.1 mg/kg of a 40% solution) after dissolving $Na_2SO_4$ and prior to dissolving NaCl. The slurry feed was filtered over a Whatman 54 (20-25 μm) filter to remove any undissolved solids. The clear filtrate obtained was concentrated batch-wise in the nanofiltration unit to a concentration factor CF=1.08, meaning that permeate was discharged, while the concentrate was returned to the feed vessel, until the ratio of the initial feed weight over the concentrate weight was 1.08. Subsequent operation under this condition with a recycle of both concentrate and permeate to the feed vessel was maintained for two hours. The concentrate under this condition contained 1,209 meq/L of $SO_4^{2-}$. Subsequently, the concentrate was further concentrated to a concentration factor of CF=1.16 (related to the original feed) by discharging permeate from the unit and recycling concentrate to the feed vessel. The membrane filtration was performed at 35 bar operating pressure and a temperature of 35° C. During the batch-wise concentration to CF=1.16 crystallization was observed in the feed vessel and very small $Na_2SO_4$ crystals were produced. Immediately after the concentration factor of CF=1.16 was reached, the mother liquor of the concentrate contained among others 1,265 meq/L $SO_4^{2-}$. After two hours of operation at CF=1.16 the concentration of the mother liquor had decreased to 1,208 meq/L $SO_4^{2-}$, while even more crystals had been formed. As compared to the Example 6, the maximum sulfate concentration for which crystallization was avoided could hardly be increased.

EXAMPLE 7

Another experiment was performed using newly installed flat sheet NF®270 polyamide thin film NF membranes (ex The Dow Chemical Company). The membrane sheets were tested simultaneously in a DSS lab stack unit, which was operated at a cross-flow rate of 600 L/h. In total 0.18 m² membrane surface area was installed. A feed was prepared by dissolving $Na_2SO_4$ in demineralized water in an amount of 62.6 g per kg of total feed and sodium chloride (NaCl (71381) ex Fluka Chemie GmbH, CH-9471 Buchs (Switzerland)) was added in an amount of 234 g per kg of total feed. 25.3 mg of Belsperse® 164 crystal growth inhibitor was added per kg of total feed (as 63.2 mg/kg of a 40% aqueous solution) after dissolving the $Na_2SO_4$ and prior to dissolving the NaCl. The slurry was filtered over a Whatman 54 (20-25 μm) filter to remove any undissolved solids. The clear filtrate obtained was concentrated batch-wise in the nanofiltration unit to a concentration factor CF=1.09, meaning that permeate was discharged, while the concentrate was returned to the feed vessel, until the ratio of the initial feed weight over the concentrate weight was 1.09. Subsequent operation under this condition with a recycle of both concentrate and permeate to the feed vessel was maintained for two hours. The concentrate under this condition contained 1,190 meq/L $SO_4^{2-}$. Subsequently, this concentrate was concentrated further to a concentration factor of CF=1.17 (related to the original feed) by discharging permeate from the unit and recycling concentrate to the feed vessel. The membrane filtration was performed at 35 bar operating pressure and a temperature of 35° C. Crystallization of $Na_2SO_4$ was not observed. Operation under this condition with a recycle of both concentrate and permeate was maintained for two hours. The concentrate at CF=1.17 contained among others 1,287 meq/L of $SO_4^{2-}$ and did not change during the two hours of operation at CF=1.17.

The invention claimed is:

1. A method for at least partially removing a soluble alkali metal or ammonium salt of a divalent anion from an aqueous, alkali metal or ammonium ion and divalent anion-containing brine solution comprising the following steps:
    a) obtaining an alkali metal or ammonium ion and divalent anion-containing brine solution having a sodium chloride concentration between 150 g/L and saturation, or having a sodium chloride concentration above saturation in the presence of a crystal growth inhibitor for sodium chloride, said brine solution optionally comprising a crystal growth inhibitor for the alkali metal or ammonium salt of said divalent anion;
    b) adding, if the concentration of the crystal growth inhibitor for the alkali metal or ammonium salt of the divalent anion (the divalent anion comprising salt) in the brine solution is less than 20 mg/L, an amount of said crystal growth inhibitor for the alkali metal or ammonium salt of the divalent anion such that said brine solution comprises at least 20 mg/L of said crystal growth inhibitor;
    c) subjecting said solution to a membrane filtration step, thereby separating the brine solution into a brine stream being supersaturated for said divalent anion-comprising salt, and a brine stream being undersaturated for said divalent anion-comprising salt;
    d) adding, if the concentration of the crystal growth inhibitor for the alkali metal or ammonium salt of the divalent anion in the brine stream being supersaturated for said divalent-anion comprising salt is less than 20 mg/L, an amount of said crystal growth inhibitor such that said brine stream comprises at least 20 mg/L of said crystal growth inhibitor;
    e) subjecting the brine stream being supersaturated for the divalent anion-comprising salt to a crystallization process; and
    f) removing crystallized alkali metal or ammonium salt of the divalent anion.

2. The method according to claim 1, wherein the divalent anion is sulfate or carbonate.

3. The method according to claim 1, wherein the alkali metal is sodium.

4. The method according to claim 1 wherein the brine solution is saturated for sodium chloride or has a sodium chloride concentration between 275 g/L and saturation.

5. The method according to claim 1, wherein the brine solution has a sodium chloride concentration between 150 g/L and saturation in the presence of a crystal growth inhibitor for sodium chloride.

6. The method according to claim 1, wherein the crystal growth inhibitor for the alkali metal or ammonium salt of the divalent anion is present in the brine stream being supersaturated for said divalent-anion comprising salt in an amount of at least 25 mg/L.

7. The method according to claim 6, wherein the crystal growth inhibitor for the alkali metal or ammonium salt of the divalent anion is present in the brine stream being supersaturated for said divalent-anion comprising salt in an amount between 75-150 mg/L.

8. The method according to claim 1, wherein the crystal growth inhibitor for the alkali metal or ammonium salt of the divalent anion is selected from the group consisting of humic acids, polymaleic acid, polyacrylic acid, sugars, oligopeptides, polypeptides, and polymers bearing two or more carboxylic acid or carboxyalkyl groups.

9. The method according to claim 8, wherein the polymers bearing two or more carboxylic acid or carboxyalkyl groups are further bearing phosphate, phosphonate, phosphino, sulfate, and/or sulfonate groups.

10. The method according to claim 1, further comprising acidifying the brine solution to a pH below 11.5, while maintaining a sodium chloride concentration of at least 150 g/L.

11. The method according to claim 10, wherein the acidification is performed in a scrubber.

12. The method according to claim 10, wherein the brine solution is acidified with $CO_2$.

13. The method according to claim 1, wherein the pH of the brine solution being subjected to the membrane filtration step is between 2 and 11.5.

14. The method according to claim 1, wherein the membrane filtration step is performed by nanofiltration.

15. The method according to claim 1, wherein step (e) is performed by the addition of seeds of the alkali metal or ammonium salt of the divalent anion to be crystallized.

16. The method according to claim 1, further comprising recycling at least part of the mother liquor of the crystallization process to the brine solution in order to subject said solution to the membrane filtration step.

17. The method according to claim 1, further comprising preparing sodium chloride from the brine stream being undersaturated for said divalent anion-comprising salt of step c) as raw material.

* * * * *